United States Patent [19]

Pladys

[11] 4,010,615
[45] Mar. 8, 1977

[54] PARTIALLY BURIED TANKS FOR THE STORAGE OF PETROLEUM PRODUCTS

[75] Inventor: Nestor Leon Pladys, Dunkerque, France

[73] Assignees: Societe Francaise des Petroles BP; Soletanche, both of France

[22] Filed: June 16, 1975

[21] Appl. No.: 586,923

[30] Foreign Application Priority Data
June 18, 1974 France .............................. 74.21158

[52] U.S. Cl. ...................................... 61/.5; 61/1 R; 220/18
[51] Int. Cl.² .......................................... B65G 5/00
[58] Field of Search ................ 61/.5, 1, 46; 220/26, 220/18

[56] References Cited
UNITED STATES PATENTS 3,537,267   11/1970   Webb .................................. 61/1 X
3,782,124   1/1974   Pladys .................................. 61/.5

*Primary Examiner*—Jacob Shapiro
*Attorney, Agent, or Firm*—Morgan, Finnegan, Pine, Foley & Lee

[57] ABSTRACT

A partially buried facility for the storage of petroleum products includes a liquid-tight equalization basin for containing water and an enclosure of at least partially dry terrain surrounding the basin, the enclosure being supported on a layer of impermeable terrain. In addition, a flat bottomed storage tank with a liquid-tight lining is located inside the enclosure and at least one lateral equalization well interrupts the bottom of the tank and penetrates the layer of impermeable terrain below. A liquid-tight pipe connects the equalization well with the equalization basin thereby enabling the equalization water to be maintained at a constant level.

3 Claims, 4 Drawing Figures

PARTIALLY BURIED TANKS FOR THE STORAGE OF PETROLEUM PRODUCTS

BACKGROUND OF INVENTION

In Pladys, U.S. Pat. No. 3,782,124, there is described a tank for the storage of petroleum products, called "partially buried", in which the vertical walls are subjected to reduced stresses by reason of the creation of a hydrostatic equilibrium between the inside and the outside of the enclosure.

In the tank of the above-mentioned patent, the useful storage level was largely housed below the normal phreatic water level, which made it necessary to provide a molded wall, outside, in order to ensure a tight seal able to protect said phreatic water level effectively from possible contamination.

The aforesaid molded wall also makes it possible to keep the storage enclosure dry, thus permitting construction of the storage tank under dry conditions, and, in addition, it eliminates any possibility of the installation being thrust upward during its operation, as a result of subjacent pressure.

Likewise, such a water-tight wall assures isolation of the site from the enclosure, and it thus effectively protects the environment. The present invention relates to improvements in partially buried devices for the storage of petroleum products;

GENERAL DESCRIPTION OF THE INVENTION

The present invention concerns the replacement of the ballast required on the sloping part of the equalizing basin, subjected to variations in the water level, and ensuring, particularly, the filtering of the water which might drain from the surrounding land, without causing erosion, by means of a water-tight surface that is lighter and more economical, ensuring the isolation of the aforesaid equalizing basin from the surrounding terrain, and, on this account, preventing any possibility of the transfer of part of the equalizing water onto the surrounding terrain, where the natural level of the water is generally below the maximum level of the water contained in said equalizing basin.

In addition, the aforesaid water-tight molded wall can then operate under stable pressure conditions, and it becomes more stable, itself, for this reason.

Finally, by thus creating in a sealed enclosure, a constant and sufficiently low water level, all possibility is eliminated of the production of high subjacent pressures able to act on the bottom of the tank, and to cause its detachment.

Another feature of the present invention which is an improvement over that disclosed in the earlier mentioned patent, concerns the possible replacement of the conical bottom, initially conceived, by a flat bottom, and the substitution of the central equalizing well called for by the earlier mentioned patent, by one or more lateral wells, these substitutions being designed to secure a pronounced economy in comparison with the initial design.

The present invention concerns the replacement of a partially buried storage tank having a constant volume of equalizing water described in the earlier mentioned patent by a partially buried storage facility adapted to maintain a constant level of equalization, providing automatic evacuation outside the sealed enclosure of the excess equalization water, and an automatic replenishment, thus ensuring the maintenance of a constant level.

In this invention, the equalizing ring does not need to have a large volume. In certain cases, it can even be completely eliminated.

The device which performs the aforesaid evacuation is then equipped with a petroleum products trap, of a known type, similar to those used in decantation basins for the exceptional case of accidental overflow of petroleum.

The equalizing pipe can also be equipped with a foot valve which closes automatically when the interface between the petroleum and the water reaches said valve.

Such a design is particularly advantageous at sites on river banks, on seas without tides, such as the Mediterranean, for example, and it can also be used on ocean shores, on condition of compensating, by pumping, the return of the equalization water toward the tank, so as to keep the outside level constant when pumping of petroleum to a point of utilization is carried out.

It is known that contact of water with petroleum, even unrefined petroleum, is not contaminating, as the two phases are not miscible. There is no objection, therefore, to sending the water to the outside, so long as this water is not carrying any hydrocarbons.

Moreover, this procedure is widely used, being applied now, particularly, in the transportation of petroleum in tankers, under reservation, naturally, of the legal obligation of trapping the petroleum carried by the deballasting water.

The improved facility of the present invention includes, like that described in the tank of the earlier mentioned patent, all equipment necessary for protecting the terrain from infiltration.

In addition, the facility of the present invention has numerous advantages, which represent substantial economy of construction over that described in the earlier mentioned patent.

In particular, the total ground area occupied is smaller, as is the amplitude of variations in the upper level of the petroleum contained in the storage tank of the invention.

In general, these variations of level can be reduced to a few meters, as a maximum, which facilitates the use of floating roofs storage tank facilities of this new type.

In fact, in the present invention, while the level of the interface between the water and the petroleum varies substantially, the upper level of the petroleum in the storage tank does not change much, as the changes are only due to the difference in density between the petroleum and the water.

The cylindrical ring of the tank, which comprises the portion of the tank which is not buried, and which, in general, is one of the most costly components, can now be of a very reduced height, thus decreasing substantially the cost of the new tank.

DETAILED DESCRIPTION OF THE PREFERRED EMBODIMENTS

The present invention will be best understood by reading the following description of three embodiments of the invention, and given by way of example, without implying limitation thereto, and described with reference to the attached drawings, in which.

Figure 3:
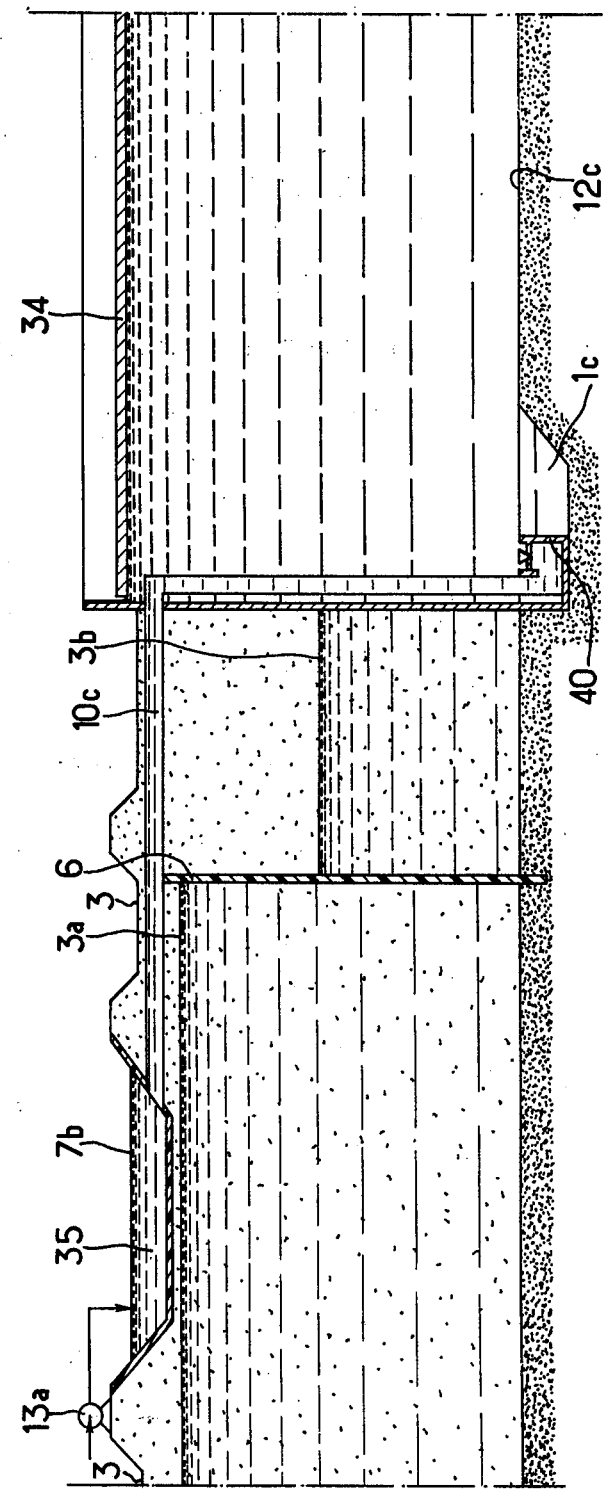
FIG. 3 is a vertical half section of a partially buried storage facility having a tank with a flat bottom and constant outside equalization water level, without equalization ring, likewise comprising a lateral equalization well, and this tank, also, is shown without the petroleum product.
Figure 4:
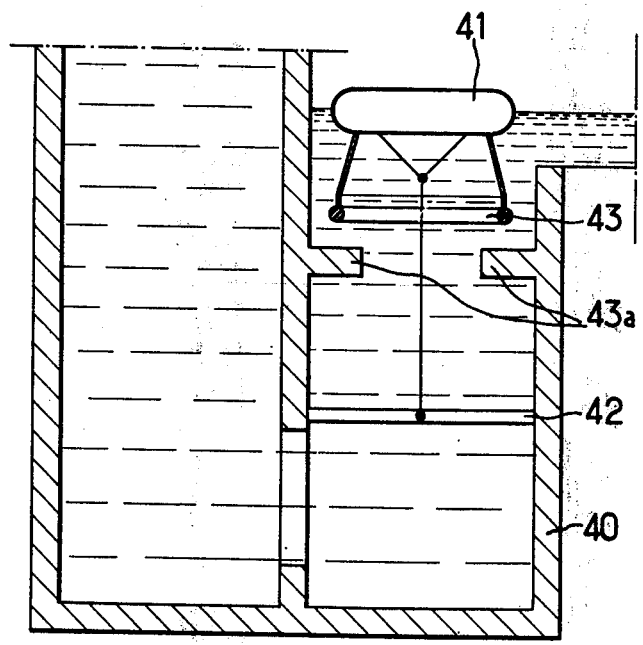

And FIG. 4, is a large scale section of a foot valve device, used in the embodiment shown in FIG. 3, for application of the invention.

Figure 1:
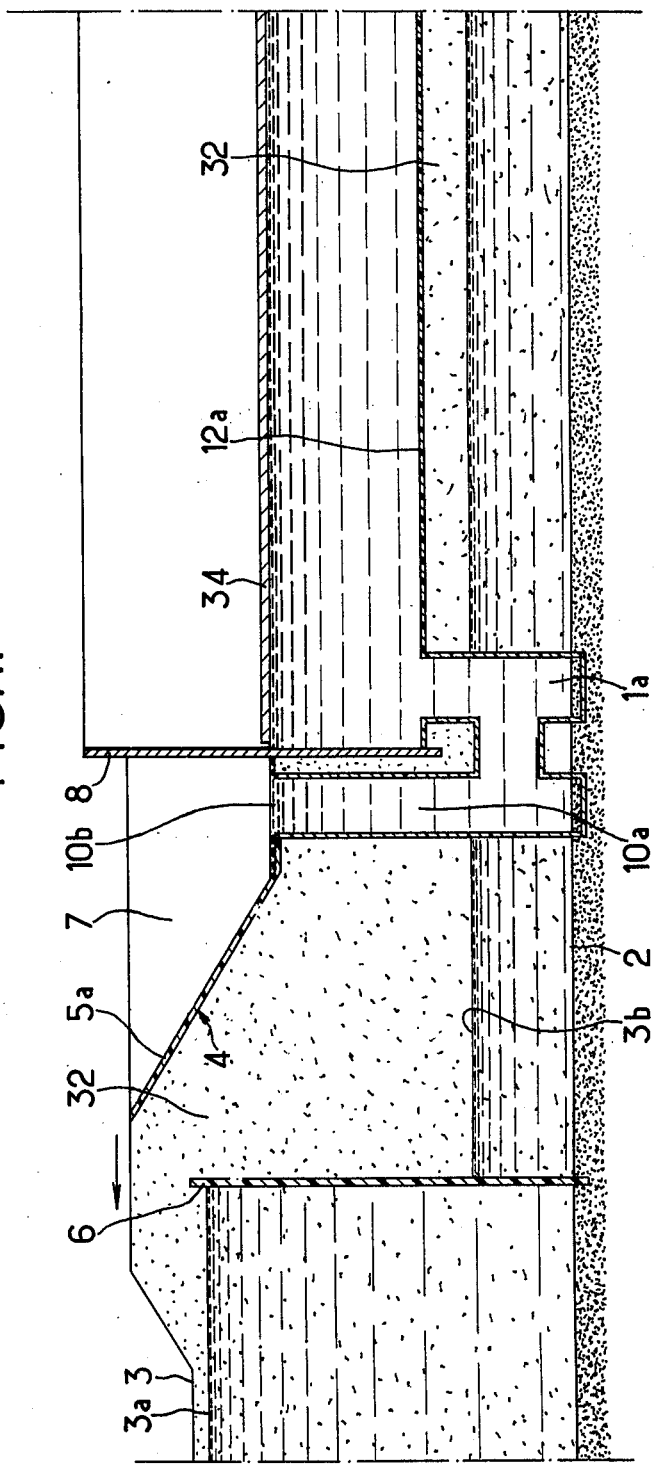
FIG. 1 is a vertical half section of a partially buried storage facility constructed in accordance with the present invention having, on the outer curve of its equalizing basin, a liquid-tight surface covering, and comprising a storage tank with a flat bottom and a lateral equilization well, this tank being represented after complete emptying of the petroleum product stored.
Figure 2:
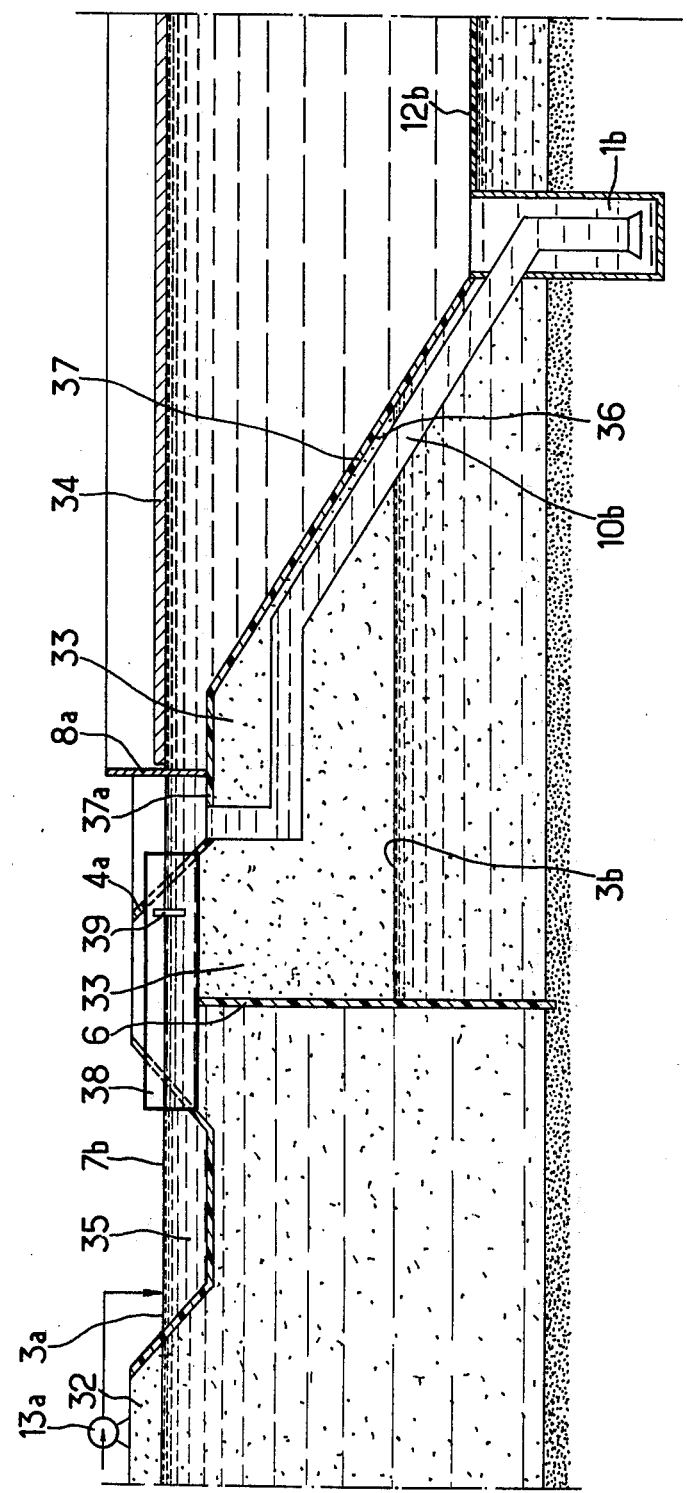
FIG. 2 is a vertical half section of a partially buried storage facility characterized by a tank with constant outside water level, likewise provided with an outside slope equipped with a liquid-tight surface covering, with a lateral equalization well, and with a bottom in the shape of a partially truncated cone, this tank being shown, as in FIG. 1, with the petroleum product completely emptied.

It is observed on the tank shown in FIG. 1, that the truncated cone slope 4 of its equalizing basin, instead of being covered by a ballast 5 shown in FIGS. 1 to 3 of the drawings of the earlier mentioned patent, is covered by a liquid-tight covering 5 a, which isolates said equalizing basin from the surrounding terrain 32. The liquid-tight shield 6 shown in FIG. 1 which is also illustrated in the drawings of the earlier mentioned patent. The bottom 12 of the tank shown in the earlier mentioned patent is replaced, in the tank of the present invention by a liquid-tight flat bottom, likewise isolating the equalization water from the aforesaid surrounding terrain.

The central well 1 of the tank of the earlier mentioned patent is replaced in the improved facility of this inveniton by a lateral well 1 a, which is buried, like the central well 1 of the tank described in the earlier mentioned patent, only to a slight depth below the level 2 of the outer portion of a natural impermeable layer, or a layer obtained by classic methods, located at a depth ranging from ten to fifty meters from the natural ground in which the storage tank of this invention is partially buried. This natural ground is visible at 3 in FIG. 1. The vertical wall of the tank, consisting, at least partially, of a metal ring, is visible at 8. The upper level attained by the phreatic water level outside the liquid-tight enclosure limited by shield 6, is visible at 3 a in FIG. 1. The water which was in the equalizing basin at 7 has descended to level 10 b of the upper portion of a quite short equalization pipe 10 a, and which connects the equalizing basis to a lateral well 1 a of the tank.

This level 10 b is likewise reached by the water in the central portion of the tank, where a floating roof 34 is in direct contact with said water.

When the tank is filled with crude petroleum by classic means not shown in the drawing, the water is forced at 7 into said annular basin, but the free surface of this water always remains at a level below that of the free surface of the petroleum contained in the tank, by reason of the difference in density between the petroleum and the water.

We have not shown in the drawing the motorized pump unit 13 which makes it possible to adjust the quantity of equalization water as a function of the density of the petroleum product to be stored, nor the pipes 15 and 16 required for connecting said motorized pump unit to a manifold 14.

It has likewise been possible to eliminate spillway 19 in the new embodiment illustrated in FIG. 1 of the drawing attached to this application.

It is to be noted that the level of the water 3 b inside the enclosure made liquid-tight by molded wall 6, and which is substantially below the level 3 a of the phreatic water level outside this enclosure, remains invariable by reason of the elimination of any possibility of infiltration of the equalization water into the surrounding terrain 32 on account of the presence of the liquid-tight bottom 12 a of the tank and the liquid-tight covering 5 a, which completely isolates the equalization water from the surrounding terrain 32.

Moreover, the hydrostatic pressure in the tank is always higher than that prevailing in the liquid-tight enclosure surrounding the tank, which fact, as explained above, constitutes a factor for the stability of the installation.

If we now examine the storage facility illustrated in FIG. 2 of the drawing attached to this application, we see at the outset that the water level is kept constant at 7 b, by means of a pumping device 13 a, while the equalizing basin comprises a slope of truncated cone shape 4 a, and the equalization piping traverses the layer of surrounding terrain 33, connecting the inside of the tank with said equalizing basin comprised between the metal ring 8 a and the aforesaid slope of truncated cone shape 4 a.

This slope must also be covered with a liquid-tight covering, in order to keep constant the phreatic water level 3 b inside the liquid-tight enclosure of the present invention.

The tank illustrated in FIG. 2, emptied of petroleum, is completely filled with water up to level 3 a, and a floating roof 34 covers this water inside said tank.

The basin 35, kept at constant level either naturally or automatically, can be connected to several partially buried tanks of the aforesaid type.

The truncated cone portion 36 of the bottom of the tank, of which the central part 12 b is flat, is lined by a liquid-tight covering 37, which extends at 37 a to the equalizing ring which surrounds metal ring 8 a.

As may be observed in FIG. 2, this equalizing ring is of very small dimensions, and it communicates by means of a trap for petroleum products represented schematically at 38, with the aforesaid basin 35, a plunging plate for holding back hydrocarbons being visible at 39.

This plate stops the petroleum products floating on the upper surface of the water kept at constant level 7 b, both in basin 35 and in the aforesaid equalizing ring.

The water contained in the tank therefore cannot pass into the surrounding terrain 33, with the result that the upper level of the phreatic water level in the liquid-tight enclosure limited by shield 6, remains invariable at 3 b.

The devices which make it possible to maintain level 7 b constant, when this level is not the same as the upper level of a lake or a sea without tides, are of the classic type, and likewise the devices which control the pump 13 a.

It will be noted that the floating roof 34, which can reach, as a maximum, the top of metal ring 8 a, only moves upward, for the reasons explained above, while the interface between the petroleum and the water can descend to the immediate vicinity of the level of the flat bottom 12 b.

This bottom must likewise be lined with a liquid-tight covering to prevent possible contamination of the terrain of the liquid-tight enclosure, because even though it is possible to arrange the installation so that this flat bottom is always in contact with the water — even when the tank is entirely filled with a petroleum product, — it is important that the level 3 b does not change.

Now, if we examine the embodiment of the present invention illustrated in FIG. 3 of the attached drawing, we find in this figure the pumping device 13 a, which keeps the water at a constant lelvel 7 b, and basin 35, which can likewise be used to supply with water at a constant outside level, several partially buried tanks of the type described herein. The flat bottom 12 c of the tank is interrupted at the periphery of the tank, by at least one lateral well 1 c. A foot valve illustrated schematically at 40, closes automatically when the tank is full of petroleum, and the interface between the petroleum and the equalization water reaches this valve, which eliminates any possibility of the petroleum being forced into the basin 35 by the equalization piping which connects well 1 c with the aforesaid basin 35.

We see, also, in FIG. 3, the level 3 a of the phreatic water level outside the liquid-tight enclosure is limited by shield 6, and the lower level 3 b of that phreatic level inside said enclosure.

In FIG. 3, which represents a tank without any petroleum product, the water has the same level 7 b inside the tank and in basin 35.

As the tank is filled with the petroleum product, the pressure applied by the equalization water brings into possible action the pumping device 13 a, if this level is not that of a lake or a sea without tides.

FIG. 4 is a cross section of the start of the equalization piping, showing foot valve 40.

In this figure we see a float 41, weighted by a suspended horizontal diaphragm 42 and integrally connected with a valve 43, which descends by its own weight when it ceases to plunge into the water, and which remains summerged, at least partially, in the petroleum, which is lighter than the water.

The weight of the overall assembly of float 41, valve 43 and diaphragm 42 can then overcome the more reduced Archimides thrust, and valve 43 presses against the valve seat 43 a, which prevents any subsequent passage of the petroleum product toward the constant level basin 35, which ensures equilibration of the petroleum product.

It is clearly understood that it is possible to apply to the embodiments just described, various changes, improvements or additions, and that certain components can be replaced by equivalent components, without thereby altering the general economy of the invention.

I claim:

1. A partially buried facility for storing petroleum products, comprising:
    a peripheral equalization basin for containing water, and having a truncated cone-shaped external slope, said basin being rendered liquid-tight by an appropriate covering;
    a liquid-tight enclosure of at least partially dry terrain surrounding said basin, said enclosure being supported on a layer of impermeable or artificially impermeabilized terrain;
    a storage tank located centrally within the confines of said enclosure, said tank comprising a cylindrical wall and, at a level above that of the bottom of said enclosure, a flat bottom covered with an isolating liquid-tight lining;
    at least one lateral equalizing wall interrupting the bottom of said tank at the periphery, said equalizing well penetrating slightly into the layer of impermeable or artificially impermeabilized terrain supporting said liquid-tight enclosure; and
    A liquid-tight pipe connecting said equalizing well with said peripheral equalization basin, said pipe traversing the layer of dried terrain as well as the phreatic water level of said-liquid tight enclosure.

2. A partially buried facility for storing petroleum products comprising:
    a peripheral equalization basin containing water and having an external slope in the shape of a truncated cone said basin being rendered liquid-tight by an appropriate covering;
    a liquid-tight enclosure of at least partially dry terrain surrounding said basin, said enclosure being supported on a layer of impermeable or artificially impermeabilized terrain;
    a storage tank situated within the confines of said enclosure, said storage tank comprising a bottom with a flat middle portion located above the level of said impermeable or artificially impermeabilized terrain, at least one lateral well descending to a level below that of said impermeable terain, said well being connected to an equalizing ring of small dimensions by means of an equalizing pipe traversing the phreatic water level and the layer of dry terrain which exists between said level and said equalizing ring, and a slope in the shape of a truncated cone extending from said lateral well to the vicinity of the bottom of a cylindrical ring of reduced height constituting the upper wall of said tank; and
    an equalizing tank of constant level or maintained at constant level, which can be used simultaneously with several partially buried facilities of a similar type, said equalizing tank being connected to said equalizing ring by means of a conduit having a trap for stopping petroleum products, the bottom of said equalizing tank being covered with a water-tight lining, and likewise the outside of said equalizing ring.

3. A partially buried storage facility in accordance with claim 2 wherein:
    the overall assembly of said cylindrical ring of reduced height and said slope in the shape of a truncated cone is replaced by a cylindrical wall having an equalizing pipe therethrough, said pipe being housed in part inside said storage tank and traversing said layer of dry terrain above the phreatic water level and above the liquid-tight shield limiting said liquid-tight enclosure into said equalizing tank, said pipe being provided, at its base, with a foot valve which closes automatically when the interface between the water and the petroleum descends below the top of a float integrated with said valve.

* * * * *